United States Patent

Kawabe et al.

Patent Number: 5,956,531
Date of Patent: *Sep. 21, 1999

[54] CAMERA AND EXTERNAL FLASH DEVICE

[75] Inventors: Koutaro Kawabe, Neyagawa; Tsutomu Ichikawa, Sakai, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/803,164

[22] Filed: Feb. 19, 1997

[30] Foreign Application Priority Data

Feb. 21, 1996 [JP] Japan .................................... 8-033839

[51] Int. Cl.⁶ ............................. G03B 15/02; G03B 15/06
[52] U.S. Cl. ............................................. 396/62; 396/175
[58] Field of Search ................................ 396/61, 62, 155, 396/164, 175, 435, 436

[56] References Cited

U.S. PATENT DOCUMENTS

| | | | |
|---|---|---|---|
| 4,306,792 | 12/1981 | Prochnow | 396/176 |
| 4,935,759 | 6/1990 | Tsuji et al. | 354/149.1 |
| 5,068,678 | 11/1991 | Mogamiya et al. | 396/62 |
| 5,250,970 | 10/1993 | Sakamoto et al. | 396/175 |
| 5,335,041 | 8/1994 | Fox | 396/61 |
| 5,363,162 | 11/1994 | Kaihara et al. | 396/175 |
| 5,473,404 | 12/1995 | Stephenson | 396/61 |

*Primary Examiner*—Eddie C. Lee
*Attorney, Agent, or Firm*—McDermott, Will & Emery

[57] ABSTRACT

A camera to which an external flash device may be mounted has a focal length detecting device which detects the focal length of a photo-taking lens, a conversion device which converts the detected focal length information into focal length information having a prescribed relationship to the detected focal length information, and a transmitter which transmits the converted focal length information to the external flash device.

28 Claims, 7 Drawing Sheets

(mm)

CAMERA AND EXTERNAL FLASH DEVICE

BACKGROUND OF THE INVENTION

1. Field of the Invention

The present invention pertains to a camera using film employing a new system as well as to an external flash device.

2. Description of the Related Art

FIG. 1 shows the size of a frame of film. This frame size is set at 36 mm×24 mm based on the dimensions of a roll of J135 film provided in JIS K7519. Conventionally, cameras that perform photo-taking by means of an exposure window with a size matching the frame size of this type of film (hereinafter '135 film') have been widely used (hereinafter 'a 135 type camera or 135 type cameras').

Some of said conventional cameras use an external flash device that may be mounted onto the camera body. Using such a camera, when an external flash device is mounted onto the camera body, the focal length data regarding the photo-taking lens of the camera is transmitted to the external flash device from the camera body. The external flash device has an auto-zoom function to control the angle of irradiation and amount of light based on the focal length data thus received, and also displays said focal length via a display unit.

FIG. 2 is a drawing to explain the relationship between focal length f of the photo-taking lens of camera 1 and angle of irradiation φ of external flash device 2. In the drawing, the distance between film surface S1 and object plane S2 is deemed d. In addition, the angle of view when focal length f=f1 is deemed θ1, and the angle of irradiation required in that instance is deemed φ1. The angle of view when focal length f=f2 is deemed θ2, and the angle of irradiation required in that instance is deemed φ2.

As shown in FIG. 2, when the relationship f1<f2 exists, the corresponding relationship θ1>θ2 results. Therefore, in order to irradiate the entire object plane S2 with the light emitted by the flash device, the angle of irradiation required of external flash device 2 is φ1 >φ2. In other words, as focal length f increases, the angle of irradiation required decreases.

Film employing a new system with a frame size of 30.2×16.7 mm, as shown in FIG. 3, (hereinafter 'new type film') has recently been proposed, and an attempt has been made to popularize the use of cameras that perform photo-taking via an exposure window of a size matching the new type film frame size (hereinafter 'a new type camera or new type cameras') together with the new type film.

Because new type film and 135 film have different frame sizes, when the object on object plane S2 is exposed onto the film located at film surface S1 using photo-taking lenses having an equal focal length, as shown in FIG. 4, if the angle of view for 135 film is θ11 and that for new type film is θ12, the relationship between the angles of view is θ11>θ12. Therefore, if the maximum size of the object on object plane S2 that may be photographed is L11 for 135 film and L12 for new type film, L11>L12 results.

Incidentally, where photo-taking is performed using the same angle of view, it is necessary to make the focal length of the photo-taking lens of a new type camera shorter than that of the photo-taking lens of a 135 type camera, and because this relationship is proportional to the ratio of the frame sizes of the two types of film, the focal length of the photo-taking lens of a new type camera must be approximately 0.8 times that of the photo-taking lens of a 135 type camera.

Therefore, considering the relationship between focal length f and angle of irradiation φ explained with reference to FIG. 2, the angle of irradiation required of the external flash device for a 135 type camera (hereinafter '135 type flash device') differs from that required of the external flash device for a new type camera (hereinafter 'new type flash device').

FIGS. 5a and 5b are drawings that show in a simplified fashion the photo-taking ranges for each type of film, or in other words, the angles of view (solid lines) and the angles of irradiation of corresponding external flash devices (chain lines). FIG. 5a shows the situation in which 135 film is used, while FIG. 5b shows the situation in which new type film is used.

As shown in FIG. 5a, the 135 type flash device has a wide angle of irradiation corresponding to 135 film that has a large angle of view. On the other hand, as shown in FIG. 5b, the new type flash device has an angle of irradiation smaller than that of the 135 flash device, corresponding to new type film that has an angle of view smaller than that of 135 film.

Therefore, if a 135 type camera, 135 type flash device, new type camera and new type flash device are used in random combination, the problems described below occur in connection with the display of the focal length in the display unit of the external flash device and in connection with the angle of irradiation during light emission.

Table 1 indicates whether the angle of irradiation of the flash device and the focal length display are acceptable in each combination of a new type camera or 135 type camera, both said cameras having a 28 mm focal length photo-taking lens, and a new type flash device or 135 type flash device, as one example. In Table 1, the 135 type camera and new type camera transmit the focal length data regarding the photo-taking lens to the external flash device without any processing.

TABLE 1

| Combination | | Angle of irradiation | | Focal length display | |
| --- | --- | --- | --- | --- | --- |
| Flash device | Camera | Illustration | Accetab-ility | Display value | Accetab-ility |
| ① New type | New type | 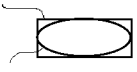 | ◯ | 28 mm | ◯ |
| ② 135 type | New type |  | ◯ | 28 mm | ◯ |
| ③ New type | 135 type | 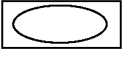 | X | 28 mm | ◯ |
| ④ 135 type | 135 type |  | ◯ | 28 mm | ◯ |

Regarding the focal length display in the display unit of the external flash device, since the focal length data regarding the photo-taking lens is transmitted without any processing to the external flash device from the camera in each combination, an accurate display is obtained in all combinations (1) through (4), as shown in Table 1.

Regarding the angle of irradiation, in combination (2) in which a 135 type flash device is mounted to a new type camera, the angle of irradiation covers the angle of view for 135 film, which is larger than that for new type film. In combination (1) in which a new type flash device is mounted to a new type camera and combination (4) in which a 135 type flash device is mounted to a 135 type camera, the angle of irradiation and the frame size match each other.

On the other hand, because a new type flash device emits light across an angle of irradiation for the angle of view for new type film when the focal length is 28 mm, in combination (3) in which a new type flash device is mounted to a 135 type camera, the angle of irradiation cannot cover the entire angle of view for 135 film which is larger than that of new type film.

SUMMARY OF THE INVENTION

The present invention resolves the problem described above. Its object is to provide a camera that can cause the external flash device to perform well regardless of whether said flash device is a new type flash device or a 135 type flash device.

Another object of the present invention is to provide an external flash device that can perform well regardless of whether it is mounted to a new type camera or a 135 type camera.

The objects of the present invention may be attained by means of a camera to which an external flash device may be mounted, said camera being equipped with a focal length detecting means that detects the focal length of the photo-taking lens, a conversion means that converts the detected focal length information into focal length information having a prescribed relationship to said detected focal length information, and a transmission means that transmits the converted focal length information to the external flash device.

The objects of the present invention may also be attained by means of an external flash device that may be mounted to a camera, said external flash device being equipped with a reception means that receives the focal length information regarding the photo-taking lens mounted to the camera body, a conversion means that converts the received focal length information into focal length information that has a prescribed relationship to said received focal length information, a light emitting unit that emits light in response to a light emission instruction from the camera, an irradiation angle changing means that changes the angle of irradiation, and a control means that drives the irradiation angle changing means based on the converted focal length information.

The objects of the present invention may also be attained by an external flash device that may be mounted to a camera having an exposure window of a first size or to a camera having an exposure window of a second size that is different from said first size, said external flash device being equipped with a reception means that receives focal length information regarding the photo-taking lens mounted to the camera body as well as information as to whether the exposure window of the camera to which said external flash device is mounted is of the first size or the second size, a light emitting unit that emits light in response to a light emission instruction from the camera, an irradiation angle changing means that changes the angle of irradiation, a conversion means that converts the received focal length information into focal length information that has a prescribed relationship to said received focal length information when the information regarding the size of the exposure window received by the reception means indicates the second size, and a control means that drives the irradiation angle changing means based on the received focal length information when the information received by the reception means regarding the size of the exposure window indicates the first size, and that drives the irradiation angle changing means based on the converted focal length information when said information received by the reception means indicates the second size.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED
Embodiments

The embodiments of the present invention are described below with reference to the drawings.

The first embodiment of the camera system in which the present invention is applied will be explained first with reference to Table 2, which is a table to indicate the acceptability of the angle of irradiation of the flash device and the focal length display in each combination of a new type camera or 135 type camera, both of said cameras having a 28 mm focal length photo-taking lens, and either a new type flash device or a 135 type flash device. In Table 2, the 135 type camera transmits the focal length data regarding the photo-taking lens to the external flash device without any processing.

Figure 4:
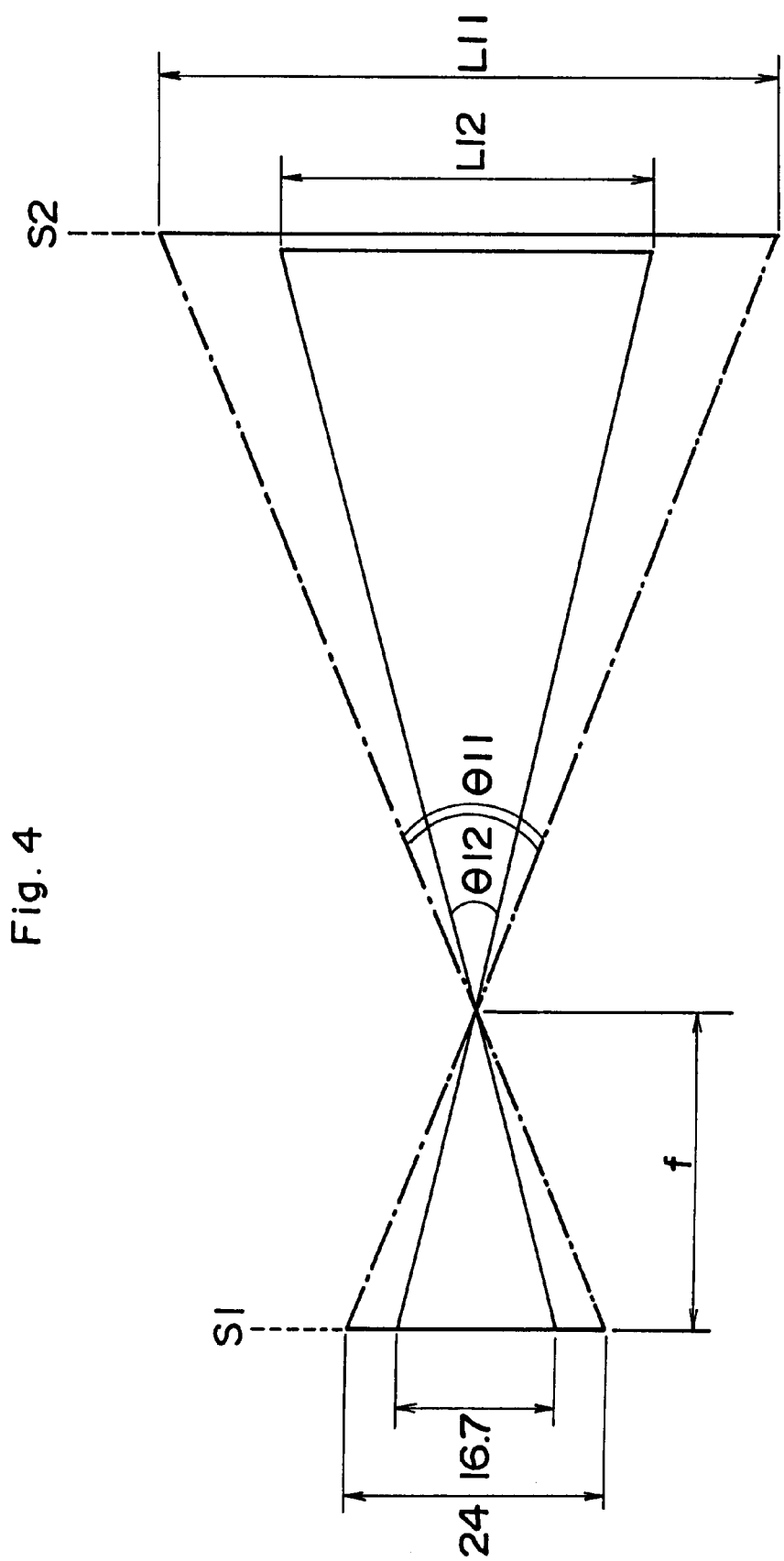
FIG. 4 is a drawing to explain the angles of view for 135 film and new type film.
Figure 5A:
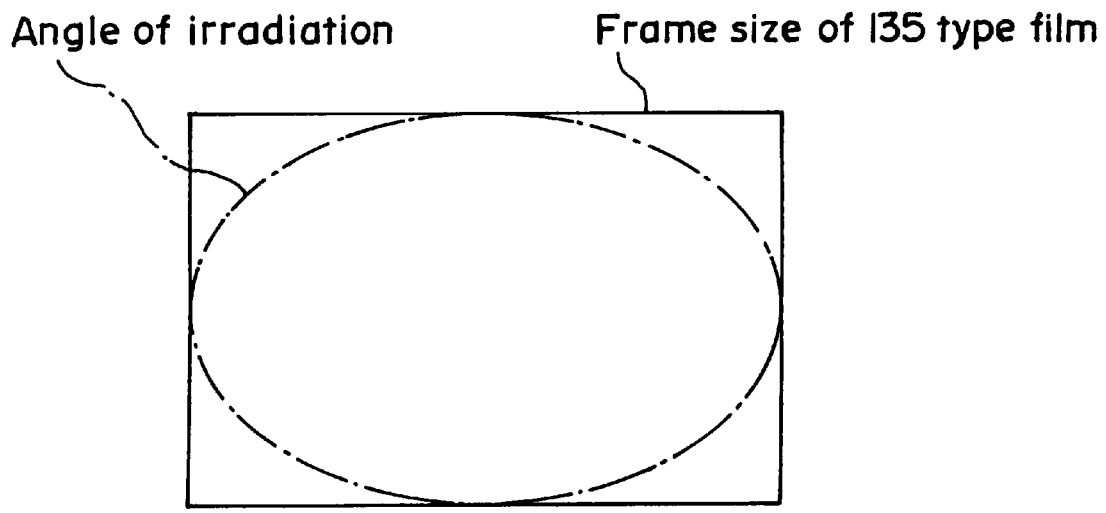
FIGS. 5a and 5b show in a simplified fashion the photo-taking ranges for each type of film, or in other words, for the angle of view (solid lines) and the angles of irradiation (chain lines) of corresponding external flash devices.
Figure 5B:
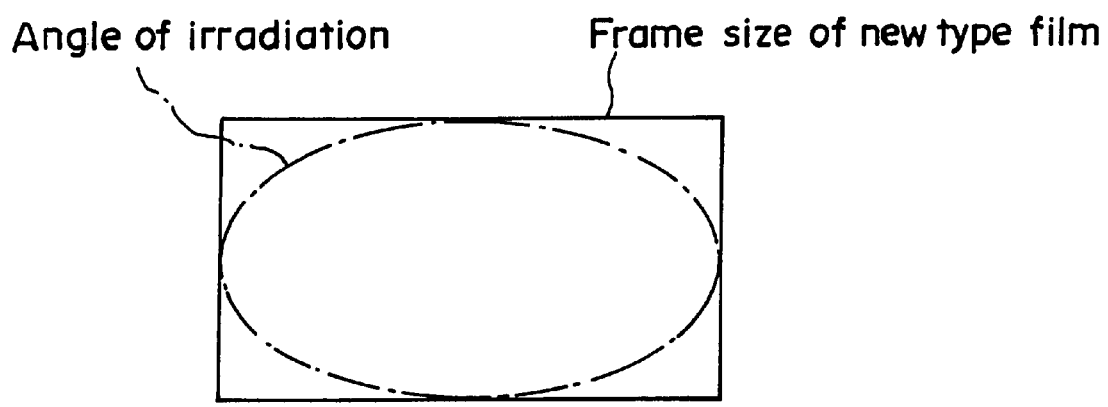

As explained with reference to FIG. 4 above, if the focal length of the photo-taking lens of a new type camera is made 0.8 times that of the photo-taking lens of a 135 type camera, approximately equivalent angles of view are obtained. Therefore, one idea is to transmit from the new type camera body to the external flash device focal length data which is converted in advance such that the angle of irradiation may match the frame size of 135 film.

Table 2, therefore, shows an instance in which the focal length data transmitted from the new type camera body to the external flash device is converted into a value 1.25 times that of the actual focal length of the photo-taking lens, or 35 mm, and said converted data is transmitted to the external flash device. In this case, the new type flash device is set in advance to perform light emission with an angle of irradiation corresponding to a focal length that is 0.8 times the focal length data received.

TABLE 2

| | Combination | | Angle of irradiation | | Focal length display | |
|---|---|---|---|---|---|---|
| | Flash device | Camera | Illustration | Accetab-ility | Display value | Accetab-ility |
| ① | New type | New type | | ○ | 35 mm | X |
| ② | 135 type | New type | | ○ | 35 mm | X |
| ③ | New type | 135 type | | ○ | 28 mm | ○ |
| ④ | 135 type | 135 type | | ○ | 28 mm | ○ |

Regarding the angle of irradiation, in combination (1) in which a new type flash device is mounted to a new type camera body, the angle of irradiation obtained corresponds to a focal length value 0.8 times the received focal length data of 35 mm, or namely 28 mm, and light emission with an appropriate angle of irradiation is carried out.

In combination (2) in which a 135 type flash device is mounted to a new type camera body, the value 35 mm is received as focal length data, based on which light emission is performed with an angle of irradiation appropriate to 135 film and a focal length of 35 mm. However, this angle of irradiation matches the angle of view for new type film when the focal length is 28 mm, and light emission is carried out with an appropriate angle of irradiation.

In combination (3) in which a new type flash device is mounted to a 135 type camera body, while the value 28 mm is received as focal length data, because the angle of irradiation is increased to an angle that matches the angle of view when the focal length is 22 mm (which is obtained through 28 mm×0.8) due to the advance setting of the new type flash device, light emission is carried out with an angle of irradiation that matches the angle of view for new type film when the focal length is 22 mm. This angle of irradiation matches the angle of view for 135 film when the focal length is 28 mm, and light emission is performed with an appropriate angle of irradiation.

In combination (4) in which a 135 type flash device is mounted to a 135 type camera body, light emission is naturally carried out with an appropriate angle of irradiation.

As described above, using the first embodiment, light emission with an appropriate angle of irradiation matching the current angle of view may be performed regardless of whether the external flash device is a new type flash device or a 135 type flash device, by converting the focal length data transmitted from the new type camera body to the external flash device into a value 1.25 times the original value and transmitting the converted data to the external flash device.

By setting the new type flash device in advance such that it will perform light emission with an angle of irradiation for a focal length value 0.8 times the focal length data transmitted from the camera body to which said flash device is mounted, light emission may be carried out with an angle of irradiation appropriate to the current angle of view regardless of whether the camera body comprises a new type camera or a 135 type camera.

Where the focal length of the photo-taking lens is displayed in the display unit of the external flash device, in combinations (1) and (2), since the focal length data received from the camera body is 35 mm, the value displayed in the display unit is 35 mm even though the focal length of the photo-taking lens is actually 28 mm, and thus a correct display of the focal length is not obtained.

Incidentally, the transmission of data from the camera to the external flash device may be either wired or wireless transmission.

Further, the information regarding the size of the exposure window may be composed such that the fact that the size of the exposure window does not match 135 film can be recognized. Using this composition, when the external flash device recognizes that the size of the exposure window of the camera does not match 135 film, it determines that said size matches new type film, and when it does not recognize that the size does not match 135 film, it determines that the size matches 135 film. Based on this routine, the angle of irradiation may be adjusted appropriately to suit 135 film or new type film.

Figure 6:
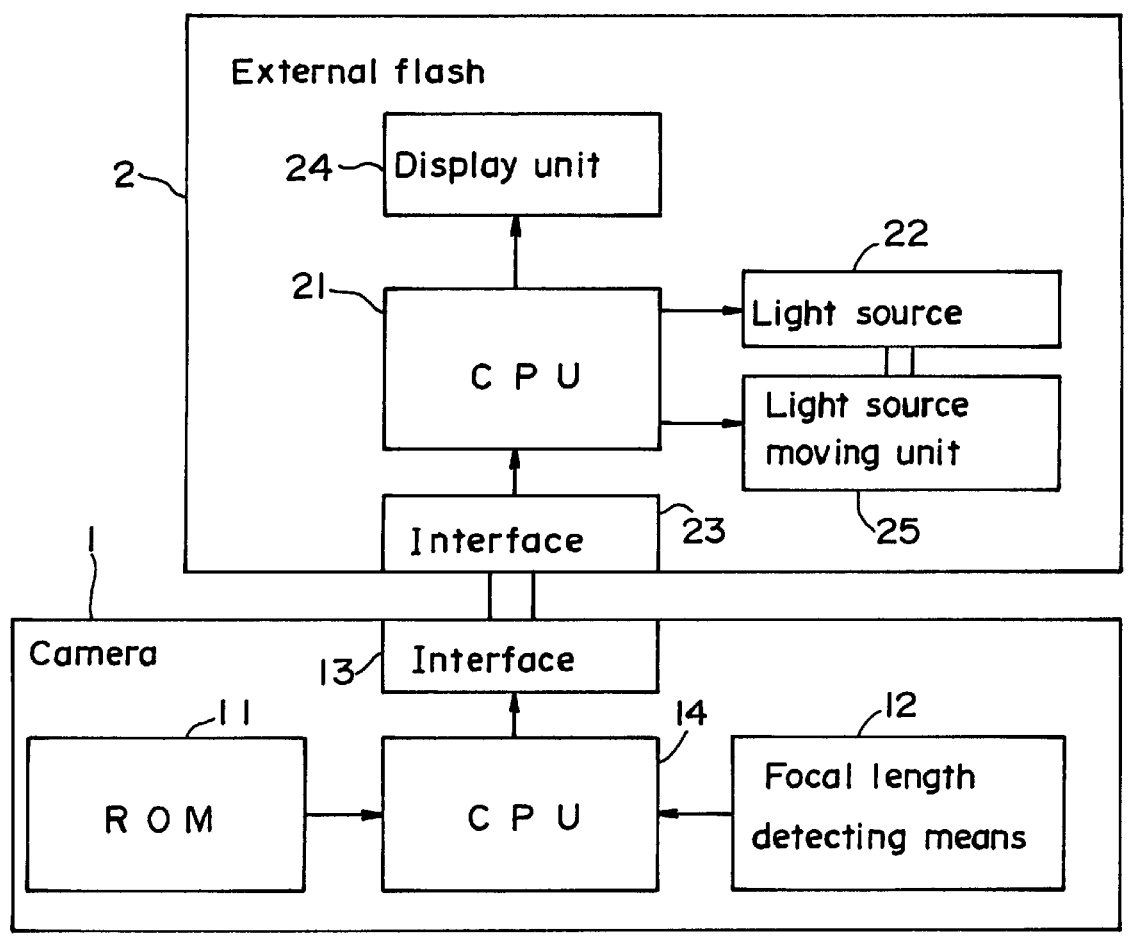
FIG. 6 is a block diagram showing the control system of the camera of the present invention.
Figure 7:
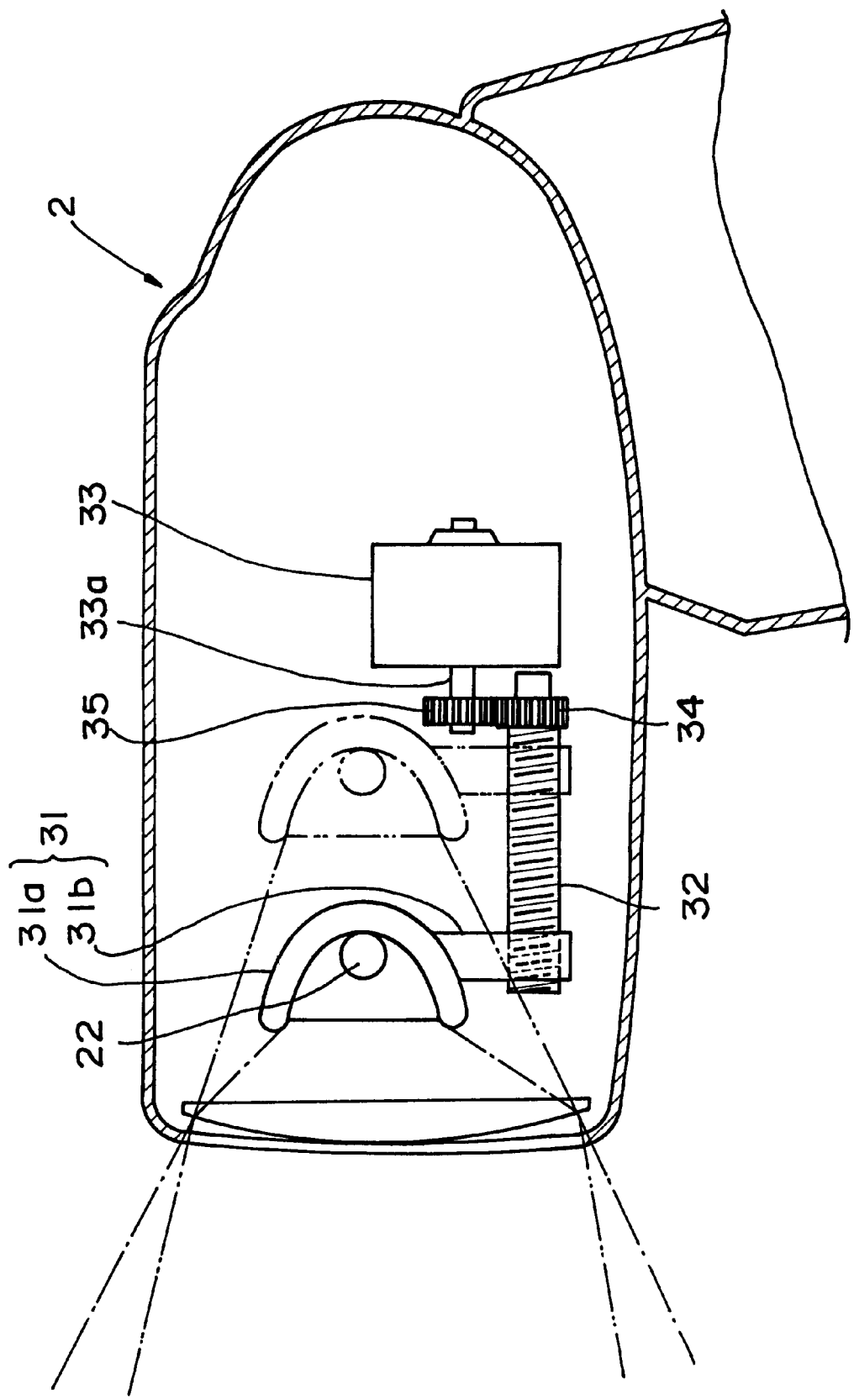
FIG. 7 shows the interior construction of the flash device outlining the construction of the light source moving unit.

The second embodiment of the camera system in which the present invention is applied will now be explained with reference to the drawings. FIG. 6 is a block diagram showing the control system of this camera system, and FIG. 7 shows the interior construction of the flash device outlining its light source moving unit.

This camera system comprises, as shown in FIG. 6, camera 1 and external flash device 2 mounted to camera 1.

Camera 1 is equipped with ROM 11, focal length detecting means 12, interface 13 and CPU 14. External flash device 2 is equipped with CPU 21, light source 22, interface 23, display unit 24 and light source moving unit 25.

Figure 1:
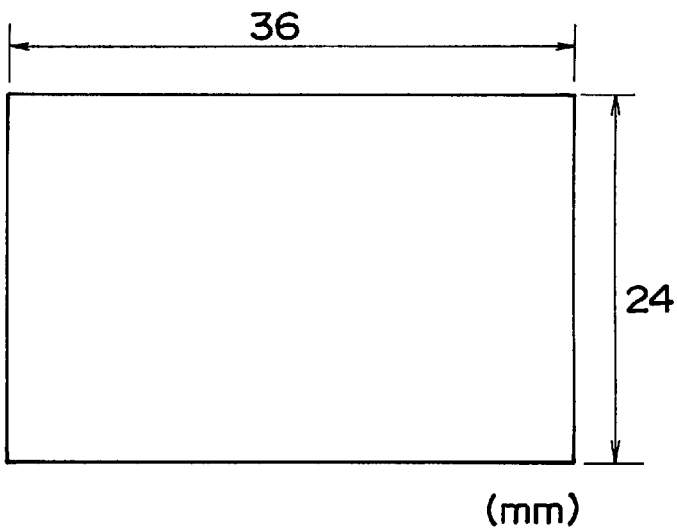
FIG. 1 shows the frame size of 135 film.
Figure 2:
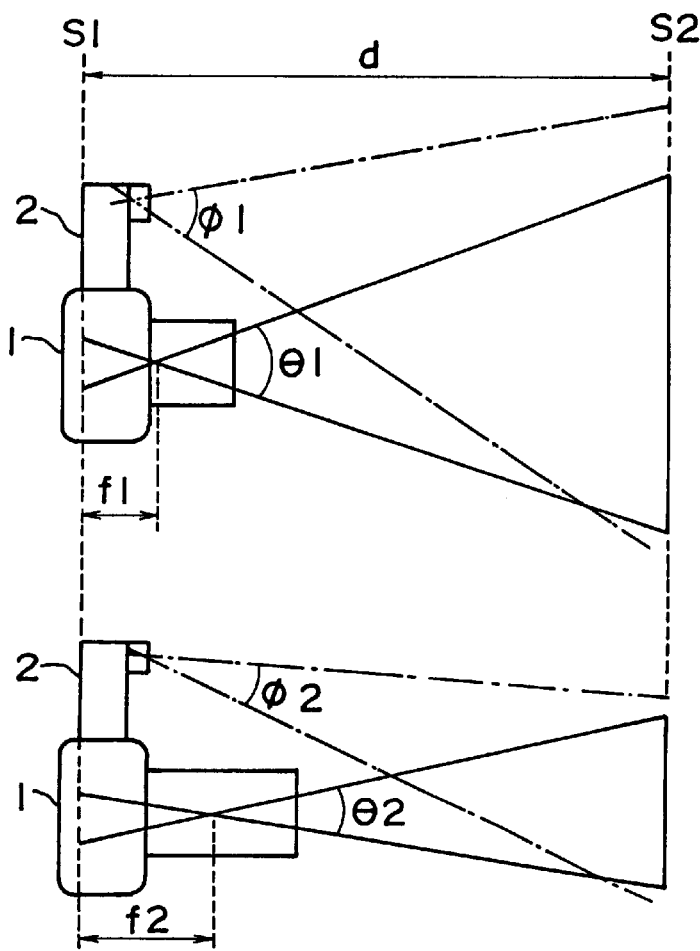
FIG. 2 is a drawing to explain the relationship between focal length f of the photo-taking lens of a camera and angle of irradiation φ required of an external flash device.
Figure 3:
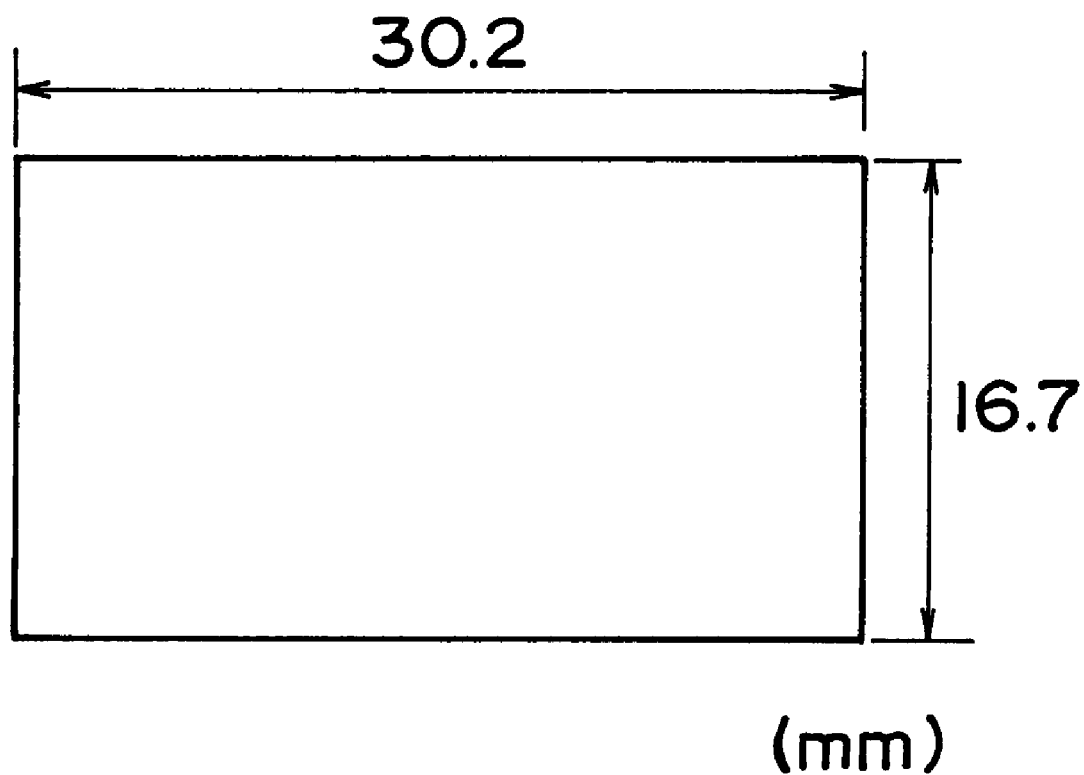
FIG. 3 shows the frame size of new type film.

This camera 1 is a new type camera that performs photo-taking with new type film, and is equipped with an exposure window of a size that matches the frame size shown in FIG. 3. ROM 11 memorizes the fact that the film used by camera 1 is new type film, or in other words, film with the frame size shown in FIG. 3.

Focal length detecting means 12 detects the focal length of the photo-taking lens, which is omitted from said drawings and which may be mounted onto camera 1 detachably or in a fixed manner. It detects the focal length by reading the focal length data saved in the ROM of the photo-taking lens. Where the photo-taking lens is a zoom lens, focal length detecting means 12 detects the focal length by reading the reference data saved in the ROM of the zoom lens and a signal corresponding to the zoom position that is output from an encoder, etc.

Interface 13 and interface 23 comprise the input/output unit for data communication, and perform transmission and reception of serial data described below between the camera and the external flash device according to a conventionally used public-domain communication protocol.

CPU 14 controls the operation to create serial data to be transmitted to external flash device 2 via interface 13 and the operation to transmit the created data to external flash device 2 as well as preparation and performance of photo-taking. CPU 14 also transmits a light emission instruction signal in synchronization with the photo-taking operation to CPU 21 of external flash device 2 via interfaces 13 and 23.

Said serial data consists of a prescribed number of bits. It comprises the focal length data pertaining to the photo-taking lens that is detected by focal length detecting means 12, as in conventional 135 type cameras, and data that indicates that camera 1 is a new type camera. The data indicating that camera 1 is a new type camera indicates this by changing a bit residing at a preset location that would be fixed at '1' in the serial data of a conventional 135 type camera to '0', or by changing a bit residing at a preset location that would be fixed at '0' in the serial data of a conventional 135 type camera to '1'.

External flash device 2 is a new type flash device and accommodates new type cameras equipped with an exposure window that matches the frame size shown in FIG. 3.

CPU 21 causes light source 22 comprising a xenon lamp, etc., to emit light upon receiving a light emission instruction signal transmitted via interfaces 13 and 23. It also extracts focal length data from the serial data described above and transmits this data to display unit 24. CPU 21 also extracts the bit at said preset location from the serial data and determines whether or not this bit indicates that the camera is a new type camera. CPU 21 also adjusts the angle of irradiation such that it will become appropriate for the frame size of new type film or 135 film by controlling light source moving unit 25 based on the result of said determination and the focal length data.

Display unit 24 comprises a liquid crystal display device, etc., and is located on the back side of external flash device 2 at a location appropriate to display the focal length data regarding the photo-taking lens.

Light source moving unit 25 is equipped with light source support 31 that supports light source 22 such that said light source may move, rotation shaft that is rotatably held onto the flash device body and motor 33, as shown in FIG. 7.

Light source support 31 comprises reflecting mirror 31a and shaft bearing 31b. Reflecting mirror 31a is located such that the reflective surface faces the front. It supports light source 22 as well as reflects the light emitted by said light source toward the front side. Shaft bearing 31b is formed as one unit with reflecting mirror 31a and supports reflecting mirror 31a.

Rotation shaft 32 has a male screw formed on it, and is engaged with the screw hole of shaft bearing 31b. Gear 34 is fixed at one end of rotation shaft 32. Gear 34 is engaged with gear 35 that is fixed to motor shaft 33a of motor 33 such that the rotational drive force of motor 33 is transmitted to rotation shaft 32 via gears 35 and 34. Motor 33 comprises a pulse motor. Its direction of rotation and amount of rotation are controlled by CPU 21.

Using the construction described above, when the focal length is short, motor 33 is caused to rotate forward to rotate rotation shaft 32, and consequently light source support 31 is moved forward to increase the angle of irradiation to an obtuse angle (the chain line in the drawing). On the other hand, when the focal length is long, motor 33 is caused to rotate backward to rotate rotation shaft 32, and consequently light source support 31 is moved backward to decrease the angle of irradiation to an acute angle (the dot chain line in the drawing).

In the second embodiment, because camera 1 to which external flash device 2 is mounted is a new type camera, CPU 21 causes light source support 31 to move so that the angle of irradiation may be adjusted to an angle that corresponds to the received focal length data.

On the other hand, where the camera to which external flash device 2 is mounted is not a new type camera, CPU 21 determines that said camera is a 135 type camera, and causes light source support 31 to move so that the angle of irradiation may be adjusted to an angle that corresponds to a value that is 0.8 times the received focal length data.

CPU 21 may be equipped with a ROM to save a data table from which to obtain the amount of movement of light source support 31 that would create an angle of irradiation that corresponds to the focal length data, or namely, the amount of rotation of motor 33.

Figure 8:
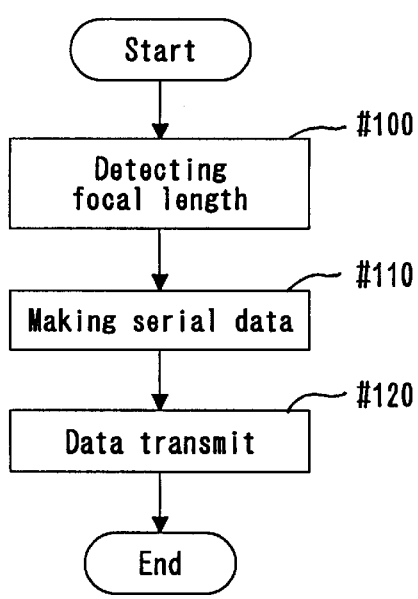
FIG. 8 is a flow chart showing the sequence of operation of the camera.

FIG. 8 is a flow chart showing the sequence of operation of camera 1.

First, the focal length of the photo-taking lens of camera 1 is detected by focal length detecting means 12 (step #100). Serial data to be transmitted from camera 1 to external flash device 2 is then created (step #110). Said data is created such that it includes data indicating that camera 1 is a new type camera. The data thus created is transmitted (step #120) and the routine comes to an end.

As described above, since data indicating that the camera is a new type camera is included in the serial data transmitted from camera 1 to external flash device 2, it is possible for external flash device 2 mounted to camera 1 to determine whether or not camera 1 is a new type camera.

Figure 9:
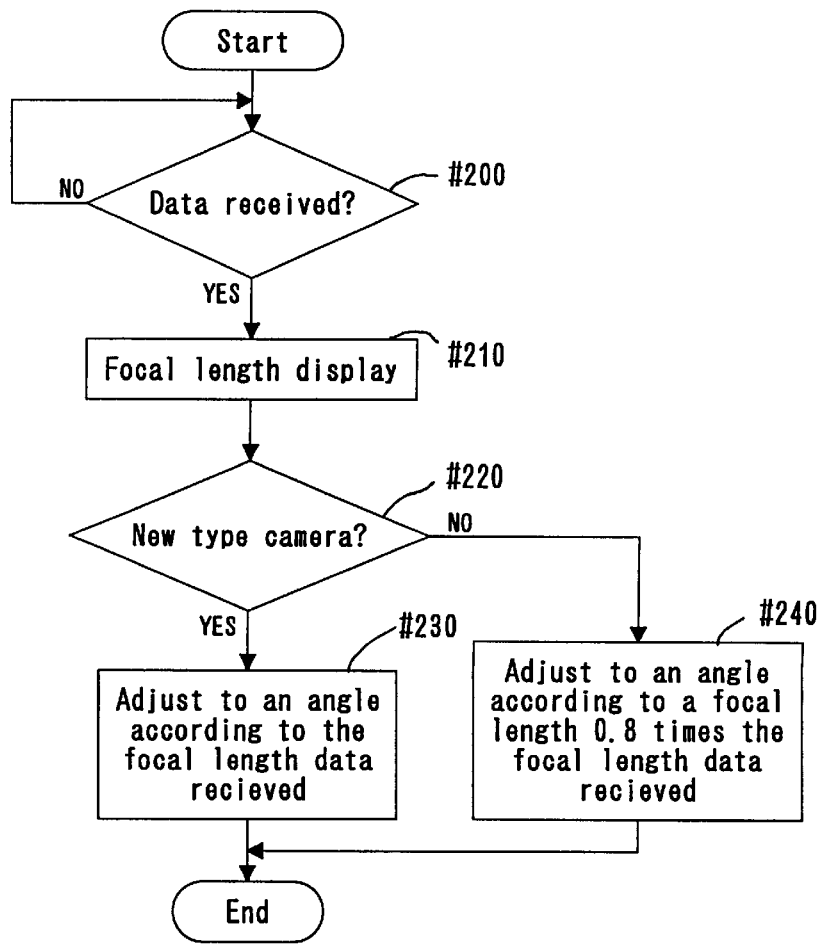
FIG. 9 is a flow chart showing the sequence of operation of the flash device.

FIG. 9 is a flow chart showing the sequence of operation of external flash device 2.

First, it is determined whether or not the serial data transmitted from camera 1 to external flash device 2 has been received (step #200). If it is determined that the data has been received (YES in step #200), the focal length is determined from the data received and displayed in display unit 24 (step #210).

It is then determined whether or not the data received includes data indicating that the camera is a new type camera, i.e., whether or not camera 1 to which external flash device 2 is mounted is a new type camera (step #220). If it is a new type camera (YES in step #220), light source 22 is moved such that the angle of irradiation may be adjusted to an angle appropriate to the focal length data received (step #230). The routine then comes to an end and external flash device 2 waits for a light emission instruction signal.

On the other hand, if camera 1 to which external flash device 2 is mounted is not a new type camera (NO in step #220), it is determined that the camera is a 135 type camera, and light source 22 is moved such that the angle of irradiation may be adjusted to an angle appropriate to a focal length 0.8 times the focal length data received (step #240). The routine then comes to an end and external flash device 2 waits for an light emission instruction signal.

As described above, it is determined whether or not the serial data transmitted from camera 1 to which external flash device 2 is mounted includes data indicating that the camera is a new type camera. External flash device 2 can therefore determine through said determination whether or not the camera to which it is mounted is a new type camera.

If camera 1 to which external flash device 2 is mounted is not a new type camera, it is determined that the camera is a 135 type camera, and the angle of irradiation is adjusted to an angle appropriate to a focal length 0.8 times the focal length data received. Based on this adjustment, light emission with an angle of irradiation that matches the frame size of 135 film may be carried out. Therefore, in this way an external flash device that can accommodate both a new type camera and 135 type camera may be realized.

TABLE 3

| Combination | | Angle of irradiation | | Focal length display | |
|---|---|---|---|---|---|
| Flash device | Camera | Illustration | Accetability | Display value | Accetability |
| ① New type | New type | | ○ | 28 mm | ○ |
| ② 135 type | New type | | ○ | 28 mm | ○ |
| ③ New type | 135 type | | ○ | 28 mm | ○ |
| ④ 135 type | 135 type | | ○ | 28 mm | ○ |

Table 3 shows whether the angle of irradiation during light emission and the focal length display are acceptable in each combination when a new type camera, which comprises said camera 1 equipped with a photo-taking lens having a focal length of 28 mm, and a new type flash device, which comprises said external flash device 2, are used.

The focal length display in display unit 24 will first be explained. Because the focal length of the photo-taking lens, i.e., 28 mm, is transmitted from the camera to the flash device without any processing, the focal length is displayed correctly in all combinations (1) through (4), as shown in Table 3.

With regard to the angle of irradiation, in combination (1) in which a new type flash device is mounted to a new type camera, the new type flash device determines that the camera to which it is mounted is a new type camera and adjusts the angle of irradiation to an angle that matches the frame size of new type film when the focal length is 28 mm, and appropriate light emission is carried out.

In combination (2) in which a 135 type flash device is mounted to a new type camera, the 135 type flash device adjusts the angle of irradiation to an angle that matches the frame size of 135 film when the focal length is 28 mm, upon which the angle of irradiation appropriate to the angle of view for the frame size of new type film is obtained and appropriate light emission is carried out.

In combination (3) in which a new type flash device is mounted to a 135 type camera, the new type flash device determines that the camera to which it is mounted is a 135 type camera and adjusts the angle of irradiation to an angle appropriate to the frame size of new type film when the focal length is 22 mm (which is obtained by multiplying 28 mm×0.8). Consequently, light emission appropriate to the angle of view for the frame size of 135 film when the focal length is 28 mm is carried out.

In combination (4) in which a 135 type flash device is mounted to a 135 type camera, the 135 type flash device adjusts the angle of irradiation to an angle appropriate to the frame size of 135 film when the focal length is 28 mm, and appropriate light emission is carried out.

As described above, correct focal length display as well as light emission with an appropriate angle of irradiation that matches the angle of view for the frame size of the film being used is possible in all combinations (1) through (4).

The present invention may also adopt a modified version of the second embodiment as described below.

ROM 11 of camera 1 memorizes the size of the exposure window of camera 1, or in other words, the frame size of the film used in said camera. CPU 14 creates serial data comprising bits that indicate the focal length of the photo-taking lens detected by focal length detection means 12 and bits that indicate the frame size, and transmits said serial data to the external flash device that is mounted to the camera.

On the other hand, CPU 21 of external flash device 2 is equipped with a ROM to save a data table from which to obtain the amount of movement for light source support 31 that would lead to an angle of irradiation corresponding to the values of said data, or in other words, the amount of rotation for motor 33, based on the film frame size data and photo-taking lens focal length data.

Using a camera system comprising camera 1 and external flash device 2 of the constructions described above, light emission may be carried out with an appropriate angle of irradiation appropriate to the angle of view corresponding to film of any frame size.

As explained above, in the present invention, because the information regarding the focal length of the photo-taking lens and the size of the exposure window is transmitted to the external flash device, the external flash device may adjust the angle of irradiation to an appropriate angle by using said information regarding the focal length of the photo-taking lens and the size of the exposure window.

In addition, the photo-taking lens focal length data is extracted from the data received, and it is determined whether or not data regarding the size of the camera's exposure window is included in the data received. The angle of irradiation is then changed in accordance with the angle of view that is arrived at based on the photo-taking lens focal length and said determination result.

The irradiation angle control means may operate such that if it is determined by the determining means that information regarding the size of the exposure window is included in the data received, said irradiation angle control means determines that the size of the camera's exposure window matches the frame size of new type film, and if it is determined that information regarding the size of the exposure window is not included, said irradiation angle control means determines that the size of the exposure window matches the frame size of 135 film. In this construction, the angle of irradiation is changed appropriately to accommodate either 135 film or new type film in accordance with the angle of view using these determination results and the photo-taking lens focal length.

Further, the irradiation angle control means may also work such that if it is determined by the determining means that information regarding the size of the exposure window is included in the data received, said irradiation angle control means determines that the information regarding the size of the exposure window is the exposure window size data. In this construction, the angle of irradiation is adjusted appropriately so as to accommodate an exposure window of any size, i.e., film having any frame size, by using the determination result and the photo-taking lens focal length.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera for use with an external flash device, said camera comprising:
   a focal length detecting device which detects the focal length of a photo-taking lens;
   a conversion means which converts the detected focal length into converted focal length information having a prescribed relationship to said detected focal length based on a type of camera,
   wherein the type of camera is determined by the size of the exposure window, and said conversion means receives data indicative of the type of camera; and
   a transmission means which transmits the converted focal length information to an external flash device,
   whereby the converted focal length information is used to set an angle of irradiation of the external flash device.

2. The camera according to claim 1,
   wherein said conversion means increases said detected focal length by 1.25 times.

3. The camera according to claim 1,
   wherein said camera is for use with different types of flash devices.

4. The camera according to claim 1,
   wherein said transmission means transmits the converted focal length information to the external flash device by wire coupling the transmission means to the external flash device.

5. The camera according to claim 1,
   wherein said transmission means transmits the converted focal length information to the external flash device by a wireless coupling between the transmission means and the external flash device.

6. A flash device for use with a camera, said flash device comprising:
   a reception means adapted to receive focal length data regarding a photo-taking lens mounted on a camera;
   a conversion means which converts the received focal length data into converted focal length information that has a prescribed relationship to said received focal length data based on the type of camera used with said flash device, wherein the type of camera is determined by the size of the exposure window, and said conversion means receives data indicative of the type of camera;
   a light emitting unit which emits light in response to a light emission instruction from the camera;
   an irradiation angle changing means which changes an angle of irradiation of said light emitting unit; and
   a driving means which drives said irradiation angle changing means based on the converted focal length information.

7. The flash according to claim 6,
   wherein said conversion means increases the received focal length by 0.8 times.

8. The flash according to claim 6,
   wherein said flash device is for use with different types of cameras.

9. A camera system, comprising:
   a camera which includes:
   a focal length detecting device which detects the focal length of a photo-taking lens;
   a control means that generates control data and a light emission instruction signal, said control data including focal length information based on the detected focal length, and camera type information which indicates a type of camera,
   wherein the type of camera is determined by the size of the exposure window; and
   a transmission means which transmits the control data and the light emission instruction signal to an external flash device; and
   an external flash device that includes:
   a reception means adapted to receive the control data and the light emission instruction signal from said transmission means;
   a conversion means, connected to said reception means, which converts the received focal length information into converted focal length information that has a prescribed relationship to said received focal length information based on the camera type information;
   a light emitting unit which emits light in response to the light emission instruction signal from the control means;
   an irradiation angle changing means which changes an angle of irradiation of said light emitting unit; and
   a driver means which drives said irradiation angle changing means based on the converted focal length information.

10. The camera system according to claim 9,
    wherein said first conversion means increases the detected focal length by 1.25 times.

11. The camera system according to claim 9, wherein said camera is for use with different types of flash devices.

12. The camera system according to claim 9, wherein said second conversion means increases the received focal length information by 0.8 times.

13. The camera system according to claim 9, wherein said external flash device is for use with different types of cameras.

14. The camera system according to claim 9, wherein said transmission means transmits the converted focal length information to the external flash device by wire coupling the transmission means to the external flash device.

15. The camera system according to claim 9, wherein said transmission means transmits the converted focal length information to the external flash device by a wireless coupling between the transmission means and the external flash device.

16. An external flash device for use with a camera having an exposure window of a first size or to a camera having an exposure window of second size that is different from said first size, comprising:

a reception means adapted to receive focal length data regarding a photo-taking lens mounted to the camera as well as exposure window size data that indicates whether the exposure window of the camera to which said external flash device is mounted is of the first size or the second size;

a light emitting unit which emits light in response to a light emission instruction from the camera;

an irradiation angle changing means which changes an angle of irradiation of said light emitting unit;

a conversion means which converts the received focal length data into converted focal length information that has a prescribed relationship to said received focal length data when the exposure window size data received by the reception means indicates the second size; and a driving means which drives said irradiation angle changing means based on the received focal length data when the exposure window size data received by said reception means indicates the first size, and that drives said irradiation angle changing means based on the converted focal length information when the exposure window size data received by said reception means indicates the second size.

17. The external flash device according to claim 16, wherein said external flash device is for use with different types of cameras.

18. The external flash device according to claim 16, wherein said conversion means increases the received focal length data by 0.8 times.

19. The external flash device according to claim 16, wherein said first size is a camera having an exposure window for a film having a frame size of 32.2 mm×16.7 mm and said second size is a camera having an exposure window for a film having a frame size of 36 mm×24 mm.

20. The external flash device according to claim 16, wherein said camera includes a memory which stores data related to the exposure window.

21. A camera for use with an external flash device, said camera comprising:

a focal length detecting device which detects the focal length of a photo-taking lens;

a conversion unit which converts the detected focal length into converted focal length information having a prescribed relationship to said detected focal length based on a type of camera, wherein the type of camera is determined by the size of a frame on a film used in the camera, and said conversion unit receives data indicative of the type of camera; and a transmission device which transmits the converted focal length information to an external flash device, whereby the converted focal length information is used to set an angle of irradiation of the external flash device.

22. The camera according to claim 21, wherein said conversion means increases said detected focal length by 1.25 times.

23. The camera according to claim 21, wherein said camera is for use with different types of flash devices.

24. The camera according to claim 21, wherein said transmission means transmits the converted focal length information to the external flash device by wire coupling the transmission means to the external flash device.

25. The camera according to claim 21, wherein said transmission means transmits the converted focal length information to the external flash device by a wireless coupling between the transmission means and the external flash device.

26. A flash device for use with a camera, said flash device comprising:

a reception device adapted to receive focal length data regarding a photo-taking lens mounted on a camera;

a conversion unit which converts the received focal length data into converted focal length information that has a prescribed relationship to said received focal length data based on the type of camera used with said flash device, wherein the type of camera is determined by the size of a frame on a film used in the camera, and said conversion unit receives data indicative of the type of camera;

a light emitting unit which emits light in response to a light emission instruction from the camera;

an irradiation angle changing device which changes an angle of irradiation of said light emitting unit based on the converted focal length information.

27. The flash according to claim 26, wherein said conversion means increases the received focal length by 0.8 times.

28. The flash according to claim 26, wherein said flash device is for use with different types of cameras.

* * * * *